US012796871B2

(12) United States Patent
Kosugi et al.

(10) Patent No.: US 12,796,871 B2
(45) Date of Patent: Nov. 17, 2026

(54) CLEANSING MACHINE

(71) Applicant: YA-MAN LTD., Tokyo (JP)

(72) Inventors: Satoshi Kosugi, Tokyo (JP); Takahide Hori, Tokyo (JP)

(73) Assignee: YA-MAN LTD. (JP)

( * ) Notice: Subject to any disclaimer, the term of this patent is extended or adjusted under 35 U.S.C. 154(b) by 408 days.

(21) Appl. No.: 18/436,141

(22) Filed: Feb. 8, 2024

(65) Prior Publication Data

US 2024/0172899 A1 May 30, 2024

Related U.S. Application Data

(63) Continuation of application No. PCT/JP2023/029677, filed on Aug. 17, 2023.

(30) Foreign Application Priority Data

Sep. 14, 2022 (JP) ................................ 2022-146522
May 1, 2023 (JP) ................................ 2023-075395

(51) Int. Cl.
*A47K 7/04* (2006.01)
*A61H 23/02* (2006.01)

(52) U.S. Cl.
CPC ............... *A47K 7/04* (2013.01); *A61H 23/02* (2013.01); *A61H 2201/1253* (2013.01); *A61H 2201/169* (2013.01); *A61H 2205/022* (2013.01)

(58) Field of Classification Search
CPC .......... A47K 7/04; A61H 33/00; A61H 23/02; B08B 3/12
See application file for complete search history.

(56) References Cited

U.S. PATENT DOCUMENTS

2020/0405047 A1* 12/2020 Miller .................. H04L 67/535

FOREIGN PATENT DOCUMENTS

| | | | |
|---|---|---|---|
| CN | 211750945 | U * | 10/2020 |
| CN | 211750946 | U | 10/2020 |
| JP | 2004-255018 | A | 9/2004 |
| JP | 2006-346415 | A | 12/2006 |
| JP | 2008-113921 | A | 5/2008 |
| JP | 2011-152376 | A | 8/2011 |
| JP | 2014-166304 | A | 9/2014 |
| JP | WO2014-192307 | A1 | 2/2017 |
| JP | 2020-039937 | A | 3/2020 |

(Continued)

OTHER PUBLICATIONS

International Search Report issued in the corresponding International Application No. PCT/JP2023/029677; mailed on Sep. 19, 2023 (total 7 pages).

(Continued)

*Primary Examiner* — Shay Karls
(74) *Attorney, Agent, or Firm* — Harness, Dickey & Pierce, P.L.C.

(57) ABSTRACT

A cleansing machine used for cleansing a skin surface of a user is provided. The cleansing machine includes a cleansing machine body, a vibration application mechanism, and a supply mechanism. The vibration application mechanism includes a vibration body configured to apply vibration to the skin surface when the vibration body is in contact with the skin surface. The supply mechanism includes a supply port from which a liquid or gel cleansing agent is supplied to the skin surface.

11 Claims, 11 Drawing Sheets

(56) References Cited

FOREIGN PATENT DOCUMENTS

| | | | | | |
|---|---|---|---|---|---|
| KR | 101501945 | B1 | * | 3/2015 | ............ A47K 7/043 |
| WO | 98-048764 | A1 | | 11/1998 | |

OTHER PUBLICATIONS

Office Action issued in the corresponding Chinese Patent Application No. 202380061298.4; dated Mar. 12, 2026 (total 16 pages).

* cited by examiner

CLEANSING MACHINE

CROSS REFERENCE TO RELATED APPLICATIONS

The present application is a continuation of PCT/JP2023/029677 filed Aug. 17, 2023 and claims priority under 35 U.S.C. § 119 to Japanese Patent Applications, Application No. 2022-146522, filed on Sep. 14, 2022, and No. 2023-075395, filed on May 1, 2023. The contents of the above noted applications are incorporated herein by reference in their entireties.

BACKGROUND

Technical Field

The present disclosure relates to a cleansing machine.

Related Art

There has been an ultrasonic beauty apparatus used in a manner that, in a state where a metal vibration plate configured to ultrasonically vibrate is brought into contact with skin and a pulsating voltage synchronized with the vibration of the vibration plate is applied to between the vibration plate and the skin, the vibration plate is moved on the skin surface (see PCT International Application, Publication No. 98/048764).

A combined use of such an ultrasonic beauty apparatus with water or beauty serum can emulsify and remove sebum from the skin surface but can hardly remove keratin plugs clogged in pores.

In view of the above circumstances, the present disclosure provides a cleansing machine capable of easily removing not only sebum on skin surfaces but also keratin plugs clogged in pores.

SUMMARY

An aspect of the present disclosure provides a cleansing machine used for cleansing a skin surface of a user. The cleansing machine includes a cleansing machine body, a vibration application mechanism, and a supply mechanism. The vibration application mechanism includes a vibration body configured to apply vibration to the skin surface when the vibration body is in contact with the skin surface. The supply mechanism includes a supply port from which a liquid or gel cleansing agent is supplied to the skin surface.

According to such an aspect, it is possible to provide a cleansing machine capable of easily removing not only sebum on skin surfaces but also keratin plugs clogged in pores.

DETAILED DESCRIPTION

Hereinafter, a description will be given of embodiments of the present disclosure with reference to drawings. Various features described in the following embodiments can be combined with each other.

A program for realizing a software described in the present embodiment may be provided as a non-transitory computer-readable memory medium, may be provided to be downloaded via an external server, or may be provided so that the program is activated on an external computer and the program's function is realized on a client terminal (that is, the function is provided by so-called cloud computing).

A term "unit" in the present embodiment may include, for example, a combination of a hardware resource implemented as circuits in a broad sense and information processing of software that can be concretely realized by the hardware resource. Furthermore, various kinds of information are described in the present embodiment, and such information may be represented by, for example, physical values of signal values representing voltage and current, high and low signal values as a set of binary bits consisting of 0 or 1, or quantum superposition (so-called qubits), and communication and computation may be executed on a circuit in a broad sense.

The circuit in a broad sense is a circuit realized by properly combining at least a circuit, circuitry, a processor, a memory, and the like. In other words, a circuit includes an application specific integrated circuit (ASIC), a programmable logic device (e.g., simple programmable logic device (SPLD), a complex programmable logic device (CLPD), field programmable gate array (FPGA), and the like.

First Embodiment

First, a description will be given of a cleansing machine according to the first embodiment of the present disclosure.

Figure 1:
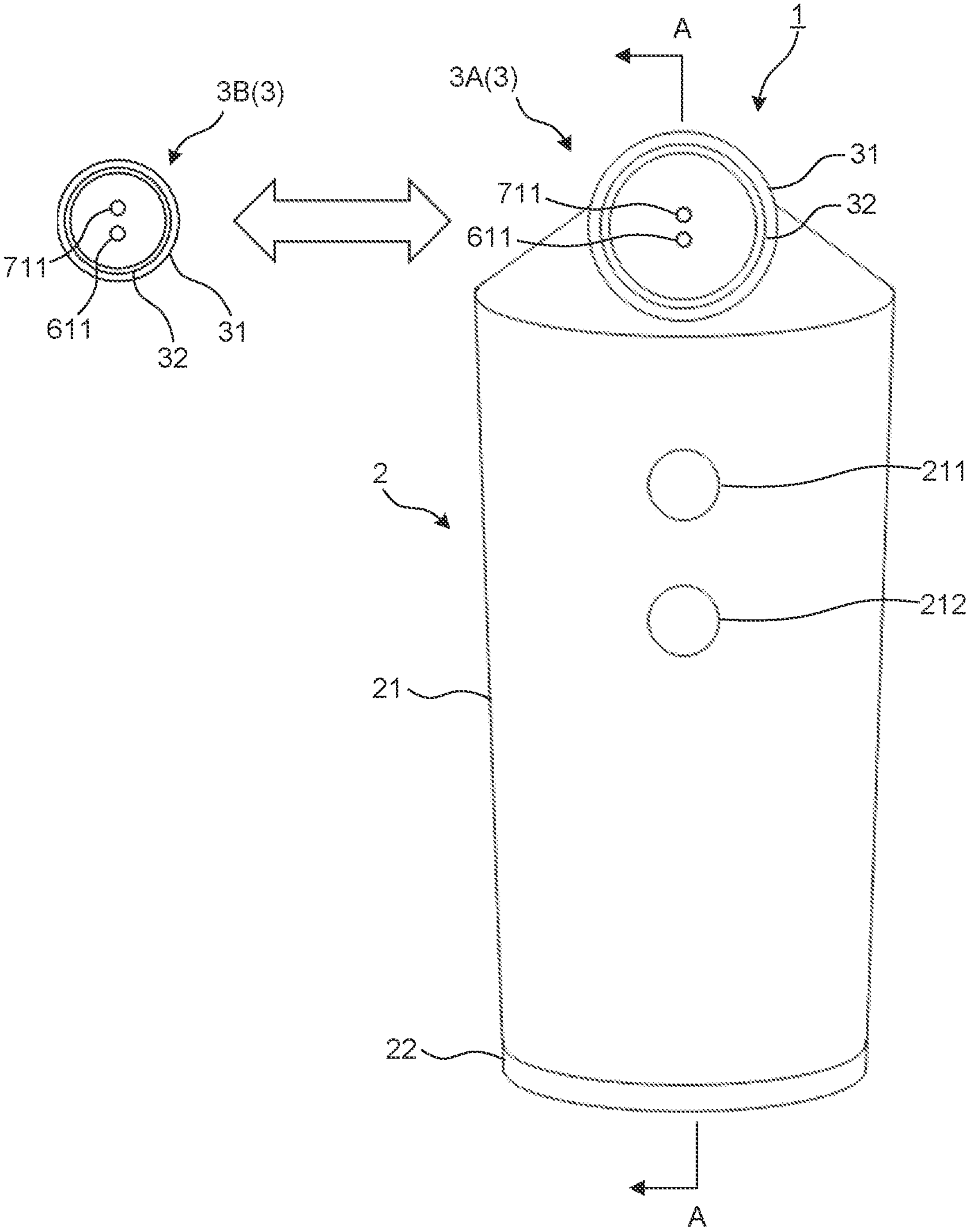
FIG. 1 is a front view illustrating a cleansing machine according to the first embodiment of the present disclosure.
Figure 2:
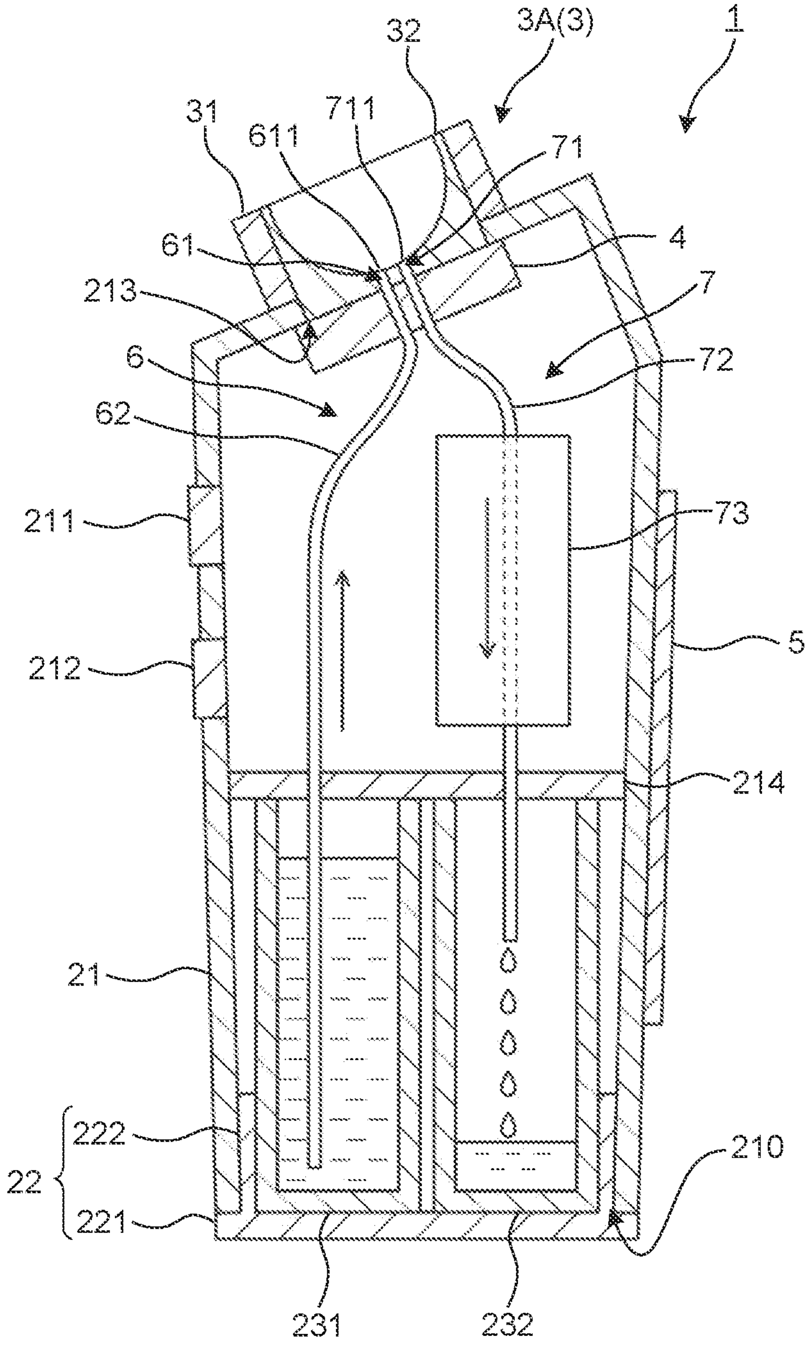
FIG. 2 is a sectional view at a line A-A in FIG. 1.
Figure 3:
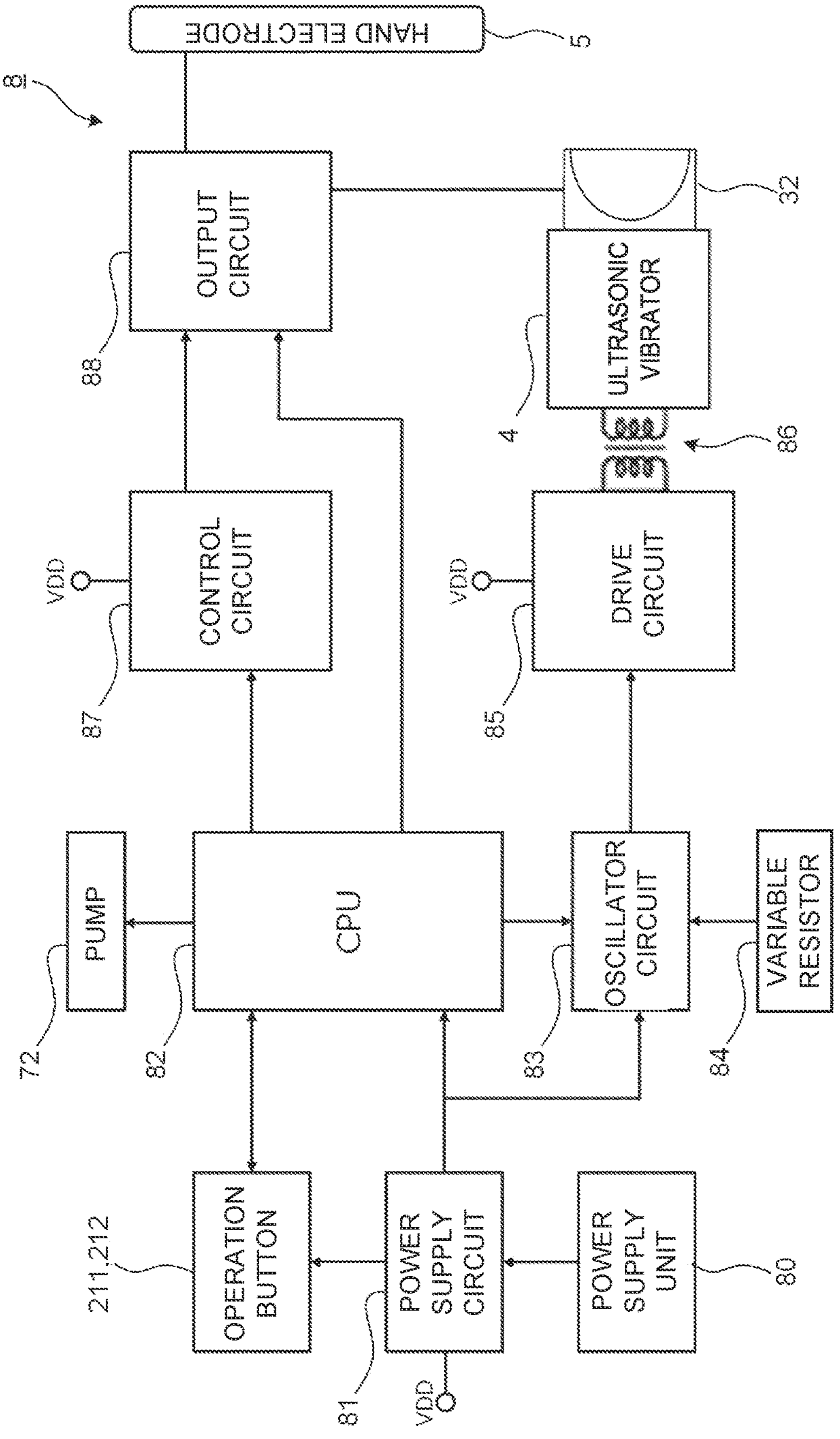
FIG. 3 is a block diagram of the cleansing machine according to the first embodiment.

FIG. 1 is a front view of a cleansing machine according to the first embodiment of the present disclosure. FIG. 2 is a sectional view at a line A-A in FIG. 1. FIG. 3 is a block diagram of the cleansing machine according to the first embodiment.

In the following description, the near side in FIG. 1 is also referred to as "front", the deep side in FIG. 1 as "back" or "rear", the left side in FIG. 2 as "front", and the right side in FIG. 2 as "back" or "rear". The upper side in FIG. 1 and FIG. 2 is also referred to as "top" or "upper" and the lower side as "bottom" or "lower.

The cleansing machine 1 illustrated in FIG. 1, etc. is used for cleansing a skin surface of a user. The cleansing machine 1 includes a cleansing machine body 2 and a head unit 3 detachably attachable to the cleansing machine body 2.

In the present embodiment, the head unit 3 includes a head unit 3A for use on a skin surface having a relatively large area (e.g., cheek) and a head unit 3B for use on a skin surface having a relatively small area (e.g., nose). That is, the cleansing machine 1 illustrated in FIG. 1, etc. has two (a plurality of) head units 3A and 3B having different sizes and is configured to be used in a state where one selected from the two head units 3A and 3B is attached to the cleansing machine body 2. Such a configuration enables provision of a treatment suitable for an area of the skin surface.

The head unit 3 may include one or more other head units different in size from the head units 3A and 3B. Two or more head units 3 may have different shapes depending on the skin surface on which they are to be used.

In the following description, when the head units 3A and 3B are no need to be particularly distinguished, they are collectively simply referred to as "head unit 3". The head unit 3 illustrated in FIG. 1 and FIG. 2 is an assembly including an annular seal member 31 and a cup-shaped (bottomed cylindrical) vibration body 32 disposed on an inner side of the seal member 31, the seal member 31 and the vibration body 32 being assembled as a whole. An inner surface of the vibration body 32 is a curved concave surface forming a hemispherical shape.

The seal member 31 may be made of, for example, a rubber material including acrylonitrile butadiene rubber (NBR), silicone rubber, acrylic rubber, ethylene propylene rubber, and the like.

The seal member 31 is configured to form a closed space with the skin surface when the seal member 31 is in contact with the skin surface in such a manner that an opening of the seal member is closed. This closed space communicates with a supply port 611 and a suction port 711 described below.

The vibration body 32 may be made of, for example, a metal material including stainless steel, copper, aluminum or aluminum alloys, titanium alloys, die steel, and the like.

An outer diameter of the vibration body 32 of the head unit 3A may be about 16 mm to about 25 mm.

On the other hand, an outer diameter of the vibration body 32 of the head unit 3B may be about 10 mm to about 15 mm.

One or both of such a head unit 3 and a cleansing machine body 2 may have an unillustrated fixing mechanism to fix them to each other.

The cleansing machine body 2 has an upper case 21 and a lower case 22.

The upper case 21 is a bottomed cylindrical member (a cylinder having a top face) and has two operation buttons 211 and 212 on its front face. For example, the operation button 211 is for power to be turned on or off, and the operation button 212 is for an operation mode of the head unit 3 to be selected and determined. The operation buttons 211 and 212 may have other functions respectively.

An upper opening 213 is formed on the top face of the upper case 21, and an ultrasonic vibrator 4 is disposed inside the upper case 21 in such a manner that the ultrasonic vibrator 4 closes the upper opening 213. The vibration body 32 of the head unit 3 is configured to contact the ultrasonic vibrator 4 when the head unit 3 is attached to the cleansing machine body 2. Thereby, the ultrasonic vibrator 4 can apply ultrasonic vibration to the vibration body 32.

A light source may be further disposed on the top face of the upper case 21 at the periphery of the upper opening 213. Such a light source may be used for decorative purposes or for visually displaying the state of use (treatment state) of the cleansing machine 1. In addition, using a blue LED as the light source may exhibit a sterilizing effect on the skin surface, a soothing effect on inflammation, and the like.

A rear face of the upper case 21 has a long hand electrode 5 disposed along the height direction of the upper case 21. This configuration allows the user's grasping hand to securely come into contact with the hand electrode 5 when the user grasps the cleansing machine body 2.

A middle part in the height direction of the upper case 21 has a division wall 214 for dividing the interior space into upper and lower sections. This division wall 214 ensures the liquid-tightness of the upper interior space. This upper interior space of the upper case 21 accommodates various electrical mechanisms.

The lower case 22 is configured to be detachably attached to the upper case 21 in such a manner that the lower case 22 closes a lower opening 210 of the upper case 21.

As illustrated in FIG. 2, the lower case 22 has a disk-shaped bottom 221 and a cylindrical insertion 222 erected from the bottom 221. The lower case 22 can be attached to the upper case 21 by inserting the insertion 222 into the lower opening 210 of the upper case 21 and fitting the insertion 222 to the inner circumference of the upper case 21.

Such an insertion 222 is disposed on the inner side of the outer edge of the bottom 221. Therefore, when the insertion 222 is inserted into the lower opening 210 of the upper case 21, the outer circumference of the bottom 221 contacts the lower edge of the upper case 21, which positions the lower case 22 relatively to the upper case 21.

The cleansing machine body 2 may have a detachment prevention mechanism configured to prevent the lower case 22 from detaching from the upper case 21 in this state. Such a detachment prevention mechanism can be formed by, for example, a claw (projection) on one of the upper case 21 and the lower case 22 and a recess or recessed groove on the other, the recess or recessed groove being configured to engage the claw.

On the inner side of the insertion 222 of the lower case 22, disposed is a first compartment (cleansing agent compartment) 231 configured to accommodate a cleansing agent to be supplied to the skin surface and a second compartment 232 configured to accommodate the cleansing agent collected from the skin surface.

Each of the first compartment 231 and the second compartment 232 is a bottomed cylindrical member. With the lower case 22 attached to the upper case 21, an upper opening of each of the first compartment 231 and the second compartment 232 is configured to be closed by the division wall 214. From the viewpoint of ensuring the liquid tightness between the upper openings of the first compartment 231 and the second compartment 232 and the division wall 214, a rubber material may be suitable as the material forming the division wall 214.

The external shape of the first compartment 231 and second compartment 232 is not particularly limited but may be a semi-circular shape in the present embodiment. This case can make the respective capacities of the first compartment 231 and the second compartment 232 sufficiently large.

At least the first compartment 231 may be configured to be a cartridge type detachably attachable to the lower case 22.

The first compartment 231 accommodates a liquid or gel cleansing agent (in the present embodiment, the cleansing agent may be liquid). The cleansing agent may contain cleansing water or a peeling agent.

The water used as cleansing water is not limited, but may include, for example, tap water, pure water, ultrapure water, distilled water, deionized water, RO water, and the like.

The peeling agent is not limited, but include, for example, aqueous solutions containing at least one of alpha-hydroxy acids (lactic acid, glycolic acid, etc.), beta-hydroxy acids (salicylic acid, etc.), and protein hydrolyzing enzymes (proteases).

Each of alpha-hydroxy acid and beta-hydroxy acid exhibits an effect of decomposing desmosomes, which are adhesive components of the stratum corneum, removing stratum corneum, and thereby facilitating expulsion of keratin plugs from the pores.

Protein hydrolytic enzymes exhibits an effect of decomposing keratin plugs and thereby enhancing drawing out of the keratin plugs from the pores.

The contents of these ingredients in the peeling agent are adjusted in consideration of the balance between the occurrences of the above effects and irritation to the skin surface.

When the cleansing agent is gel, a gelling agent may be added to the liquid cleansing agent. The gelling agent includes, for example, pectin, carrageenan, xanthan gum, guar gum, gum arabic, methylcellulose, gelatin, and the like.

The material forming the cleansing machine body 2 is not particularly limited, but may include, for example, hard plastic materials such as polycarbonate, polypropylene, polystyrene, ABS resin, and the like.

The cleansing machine 1 further includes a supply mechanism 6 and a suction mechanism 7, as illustrated in FIG. 2.

The supply mechanism 6 has a through hole 61 penetrating the bottom of the vibration body 32 in the thickness direction and a supply tube (supply channel) 62 made of polyvinyl chloride, for example.

The through hole 61 is disposed at the center part of the bottom of the vibration body 32, forming a supply port 611 configured to supply the cleansing agent to the skin surface. In other words, the supply mechanism 6 includes a supply port 611 from which the cleansing agent is supplied to the skin surface.

The supply tube 62 is fixed with its upper end part penetrating the ultrasonic vibrator 4. As illustrated in FIG. 2, the through hole 61 and the supply tube 62 are connected when the head unit 3 is attached to the cleansing machine body 2. The supply tube 62 penetrates the division wall 214 and is configured so that, when the lower case 22 is attached to the upper case 21, the lower end part of the supply tube 62 is immersed in the cleansing agent accommodated in the first compartment 231. Thereby, the supply tube 62 connects the supply port 611 and the first compartment 231.

The suction mechanism 7 has a through hole 71 penetrating the bottom of the vibration body 32 in the thickness direction, a suction tube (suction channel) 72 made of, for example, polyvinyl chloride, and a pump 73 configured to reduce the pressure in the suction tube 72. In the present embodiment, the pump 73 is disposed at the middle part of the suction tube 72.

The through hole 71 is disposed on the center part of the bottom face of the vibration body 32, forming a suction port 711 into which the cleansing agent supplied to the skin surface is sucked. In other words, the suction mechanism 7 includes a suction port 711 from which the cleansing agent supplied to the skin surface is sucked.

The suction tube 72 is fixed with its upper end part penetrating the ultrasonic vibrator 4. As illustrated in FIG. 2, the through hole 71 and the suction tube 72 are connected when the head unit 3 is attached to the cleansing machine body 2. The suction tube 72 penetrates the division wall 214 and is configured so that its lower end part is disposed inside the second compartment 232 when the lower case 22 is attached to the upper case 21. With such a configuration, the suction tube 72 communicates with (or connects) the suction port 711 and the second compartment 232.

Thus, in the present embodiment, the seal member 31 surrounds the supply port 611 and the suction port 711.

With the above configuration, bringing the seal member 31 into contact with the skin surface allows the supply tube 62 and the suction tube 72 to be connected via a closed space (sealed space) defined by the seal member 31 and the skin surface. In this state, activating the pump 73 allows the cleansing agent to be supplied to the skin surface via the supply tube 62, the through hole 61, and the supply port 611 in sequence (i.e., supplied from the supply mechanism 6).

The cleansing agent supplied to the skin surface passes through the suction port 711, the through hole 71, and the suction tube 72 in sequence and is collected to in the second compartment 232.

Next, a description will be given of the electrical configuration of the cleansing machine 1 (power supply apparatus 8).

The power supply apparatus 8 illustrated in FIG. 3 includes a power supply unit 80, a power supply circuit 81, a CPU 82, an oscillator circuit 83, a variable resistor 84, a drive circuit 85, a transformer 86, a control circuit 87, and an output circuit 88.

The power supply unit 80 may include, for example, an adapter etc. for connection to an external power source, as well as a primary battery such as a dry cell, a solar cell, a fuel cell, etc. and a secondary battery such as a lithium-ion battery, etc.

CPU 82 has a built-in operation element and memory element.

The operation element is formed by, for example, a central processing unit (CPU), a micro processing unit (MPU), or the like. The operation element reads a predetermined program stored in the memory element to realize various functions related to the cleansing machine 1. In other words, the operation element concretely realizes information processing of software stored in the memory element.

The operation element is not limited to be a single element, but may be multiple operation elements provided for each function. Alternatively, the operation element may be a combination of a single element and multiple elements. In particular, an operation element may be provided for electrification control on the vibration body 32 separately from an operation element for activation control on the ultrasonic vibrator 4.

The memory element stores various types of information as defined by the foregoing description. The memory element can be implemented, for example, as a storage device such as a solid state drive (SSD) storing various programs, etc. pertaining to the cleansing machine 1 and executed by the operation element, or as a memory such as a random access memory (RAM) storing temporarily necessary information (arguments, sequences, etc.) pertaining to program operations.

The memory element stores various programs, variables, etc. pertaining to the cleansing machine 1 that are executed by the operation elements.

The power supply circuit 81 supply voltage to the ultrasonic vibrator 4 via a vibration power circuit including the oscillator circuit 83, a drive circuit 85, and a transformer 86. An oscillation signal from the oscillator circuit 83 controls the oscillation frequency of the voltage. The oscillator circuit 83 is equipped with the variable resistor 84, the variable resistor 84 allowing the oscillation frequency of the oscillator circuit 83 to be adjusted for each of the ultrasonic vibrators 4 so that the oscillation frequency matches natural vibration of the ultrasonic vibrator 4.

In the present embodiment, the vibration body 32, the ultrasonic vibrator 4, the power supply circuit 81, the oscillator circuit 83, the drive circuit 85, and the transformer 86 form a vibration application mechanism. In other words, the cleansing machine 1 further includes a vibration application mechanism, and this vibration application mechanism includes the vibration body 32 configured to apply vibration to the skin surface when the vibration body 32 is in contact with the skin surface.

The power supply circuit 81 further supplies voltage to the vibration body 32 and the hand electrode 5 via the output circuit 88. The control circuit 87 can adjusts the output cycle and polarity (positive charge or negative charge) of this output circuit 88.

In the present embodiment, the vibration body 32, the hand electrode 5, the power supply circuit 81, the output circuit 88, and the control circuit 87 form a charge mechanism. In other words, the cleansing machine 1 further includes a charge mechanism configured to charge the vibration body 32 with a positive charge or a negative charge. The position of the hand electrode 5 is not limited to the position illustrated in the drawings. Furthermore, the overall configuration of the charge mechanism is not limited to the configuration illustrated in the drawings, as long as the vibration body 32 can be charged with a positive charge or a negative charge.

By applying a voltage to the vibration body 32 in contact with the skin surface and the hand electrode 5 in contact with the hand gripping the cleansing machine body 2, the vibration body 32 can be charged. The vibration body 32 charged with a positive charge can exhibit an effect of drawing out proteins, etc. present in the pores (ion cleansing effect). The vibration body 32 charged with a negative charge can exhibit an effect of deliver ions into the pores (iontophoresis effect).

Next, a description will be given of the use (action) of the cleansing machine 1.

[1] First, the power is turned on by pressing the operation button 211 on the cleansing machine body 2. This activates the vibration application mechanism and thereby the vibration body 32 starts to ultrasonically vibrate. The pump 73 also starts to operate, but the inner space of the seal member 31 is an open space, and thus in this state, no suction force acts to suck out the cleansing agent from the first compartment 231.

[2] Next, the operation mode of the head unit 3 is determined. For example, ultrasonic vibration mode, ultrasonic vibration/vibration body positive charge mode, ultrasonic vibration/vibration body negative charge mode, etc. can be set as the operation mode. The operation mode can be selected by, for example, the pressing number of times, the pressing time, or the like on the operation button 212.

[3] The end part of the seal member 31 of the head unit 3 is then brought into contact with the desired skin surface. This forms a closed space between the seal member 31 and the skin surface. In other words, the inner space of the seal member 31 becomes a closed space (sealed space). Thereby, the supply tube 62 and the suction tube 72 are connected through this closed space. As a result, the activation of the pump 73 allows the cleansing agent to be sucked out from the first compartment 231, transferred inside the supply tube 62, and supplied to the skin surface from the supply port 611.

In this state, the vibration body 32 is also in contact with the skin surface, applying ultrasonic vibration to the skin surface.

Here, the frequency of ultrasonic vibration is not particularly limited, but may be about 10 kHz to about 100 kHz, or may be about 20 kHz to about 90 kHz. The frequency of the ultrasonic vibration can be adjusted by devising the shape of the vibration body 32.

The cleansing agent and the ultrasonic vibration can emulsify and remove sebum present on the skin surface. When a peeling agent is used as the cleansing agent, keratin plugs clogged in pores can be smoothly removed, and thus sebum and dirt (waste) deep in the pores can also be effectively removed. In addition, when the vibration body 32 is charged with a positive charge, it is possible to exhibit an effect of enhancing drawing out of dirt, etc. from the pores.

The cleansing agent to which the sebum and dirt have migrated is then sucked into the suction port 711 by the suction mechanism and collected into the second compartment 232.

In this way, the cleansing machine 1 can easily remove not only sebum on the skin surface, but also keratin plugs, sebum, and dirt clogged in the pores.

After the skin surface cleansing, the vibration body 32 may be charged with a negative charge and then iontophoresis for delivering negative ions to the skin surface may be carried out. At this time, when a beauty essence is supplied to the skin surface, the delivery effect of the beauty essence to the skin surface can be improved.

The part of the upper case 21 lower than the division wall 214 may be transparent (colorless and transparent, colored transparent, or translucent). This allows the condition and color of the cleansing agent collected into the second compartment 232 to be visible from the outside of the cleansing machine body 2.

A light source (e.g., white LED) may be disposed near the division wall 214 inside the upper case 21. In this case, the condition and color of the cleansing agent collected into the second compartment 232 can be more clearly visible from the outside of the cleansing machine body 2.

The head unit 3 may also be configured as described below.

Figures 4A, 4B, 4C:
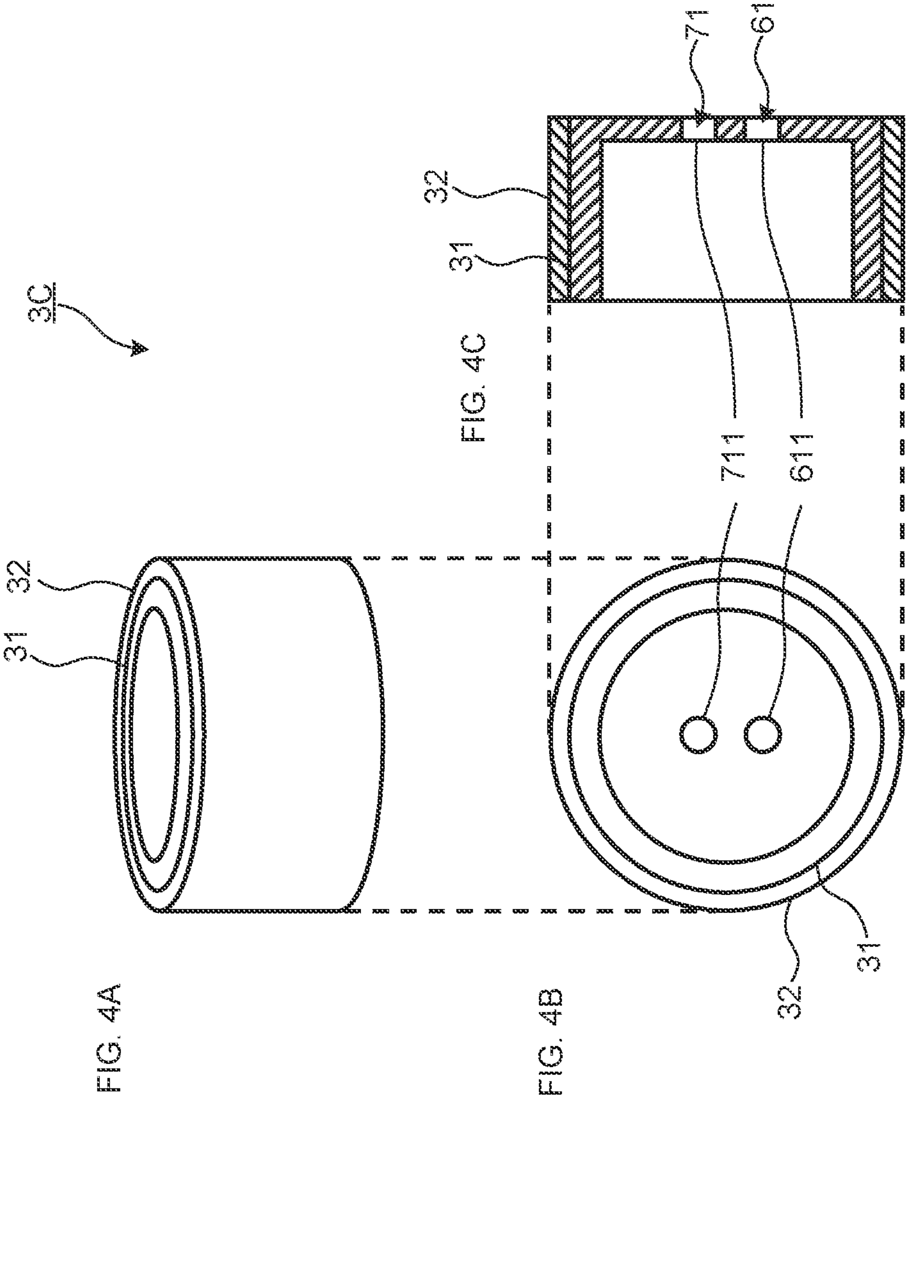
FIGS. 4A-4C illustrate a head unit with another configuration as a perspective view in FIG. 4A, a plan view in FIG. 4B, and a sectional view in FIG. 4C.

FIGS. 4A-4C illustrate a head unit with another configuration as a perspective view in FIG. 4A, a plan view in FIG. 4B, and a sectional view in FIG. 4C.

The head unit 3C illustrated in FIGS. 4A-4C has a bottomed-cylindrical (bottle-cap shaped) seal member 31 and an annular vibration body 32 disposed on the outer side of the seal member 31.

At the bottom part of the seal member 31, a through hole 61 having a supply port 611 and a through hole 71 having a suction port 711 are formed along the thickness direction.

Such a head unit 3C also exhibit actions and effects similar to those of the above-described head units 3A and 3B. In addition, as in the relationship between head units 3A and 3B, a head unit having a size different from the size of the head unit 3C can be prepared depending on the area (site) of the skin surface to be cleansed.

The front face of the cleansing machine body 2 may have a mode lamp configured to light up to indicate the selected operation mode. When the power of the cleansing machine 1 is off, the mode lamp may be configured to turn off.

When the power supply unit 80 is a secondary battery (rechargeable battery), the front face of the cleansing machine body 2 may have a charging lamp configured to light up when the secondary battery is in the charging state and turn off when the battery is fully charged.

In this case, a charging terminal unit may be further disposed on the lower part of the rear face of the cleansing machine body 2.

The head unit 3 may also be configured as follows.

Figure 5:
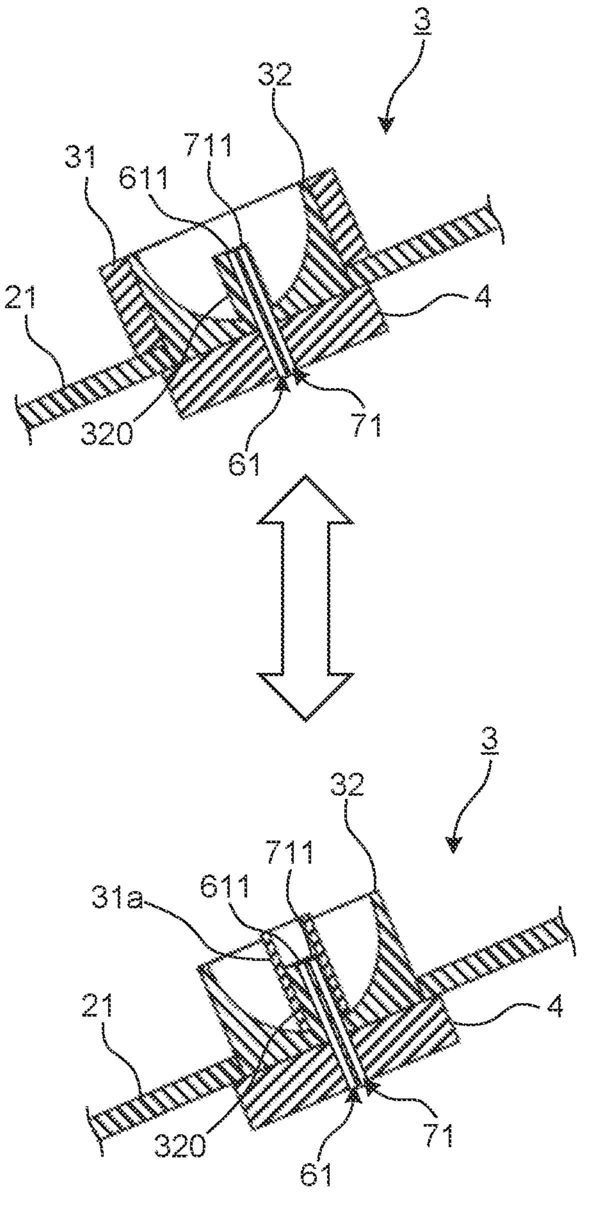
FIG. 5 is a sectional view of the head unit with another configuration.
Figure 6A:
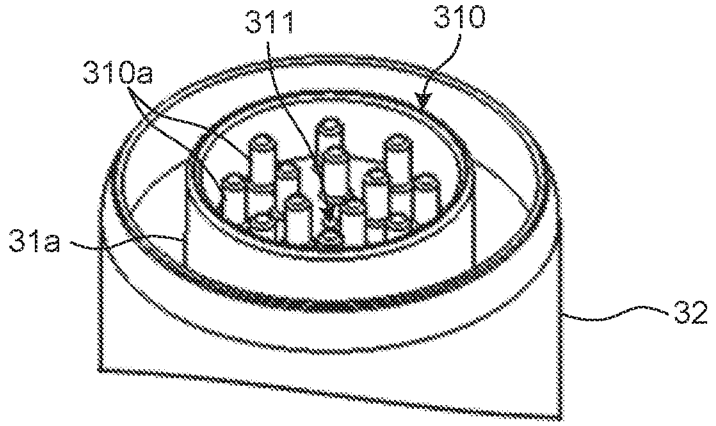
FIGS. 6A and 6B are a perspective view (FIG. 6A) and a sectional view (FIG. 6B) illustrating a tip part of a small diameter seal member.
Figure 6B:
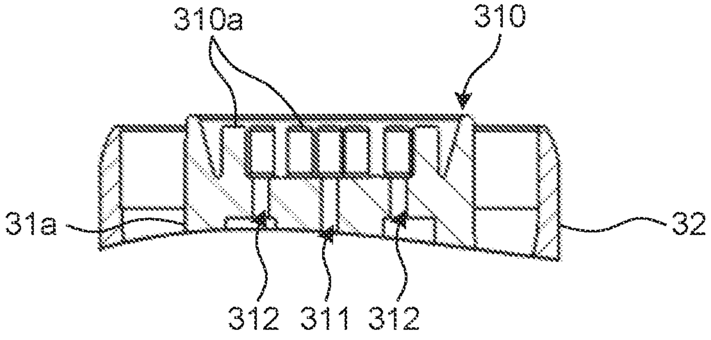

FIG. 5 is a sectional view of a head unit with another configuration. FIGS. 6A and 6B are a perspective view (FIG. 6A) and a sectional view (FIG. 6B) illustrating a tip part of a small diameter seal member.

The head unit 3 illustrated in FIG. 5 has two (a plurality of) seal members 31 and 31*a* of different types. In the configuration illustrated in FIG. 5, the vibration body 32 is fixed to the ultrasonic vibrator 4. A cylindrical protrusion 320 is disposed on the center part of the vibration body 32, and the through holes 61 and 71 are formed on the protrusion 320. In other words, an end face of the vibration body 32 has a cylindrical protrusion 320 where the supply port 611 and the suction port 711 are disposed. The position of the through hole 61 substantially matches the central axis of the protrusion 320, while the through hole 71 is shifted from the central axis of the protrusion 320.

The seal member 31 has an annular shape and is detachably attachable to the outer circumferential face of the vibration body 32. The small diameter seal member 31*a* has a smaller diameter than the seal member 31, has an annular shape, and is detachably attachable to the outer circumferential face of the protrusion 320 (disposed on an outer side of the protrusion 320). In other words, the configuration is such that for use, one selected from the two seal members 31 and 31*a* is attached to the vibration body 32.

With the small-diameter seal member 31*a* attached to the outer circumferential face of the protrusion 320, the supply port 611 and the suction port 711 are exposed to the outside from the small-diameter seal member 31*a*. In this state, the tip part of the small-diameter seal member 31*a* protrudes slightly from the vibration body 32.

A brush structure 310 having a plurality of projections 310*a* may be disposed on the tip part of the small-diameter seal member 31*a*, as illustrated in FIG. 6. Providing such a brush structure 310 can improve the efficiency of removing keratin and keratin plugs.

The brush structure 310 has a through hole 311 disposed substantially on the central axis of the brush structure 310 and a plurality of through holes 312 arranged along the circumferential direction with the through hole 311 centered. In a state where the small-diameter seal member 31*a* is attached to the outer circumferential face of the protrusion 320, the through hole 311 is connected to the supply port 611 (through hole 61), and the plurality of through holes 312 are connected to the suction port 711 (through hole 71).

The head unit may be configured as described below.

Figure 7:
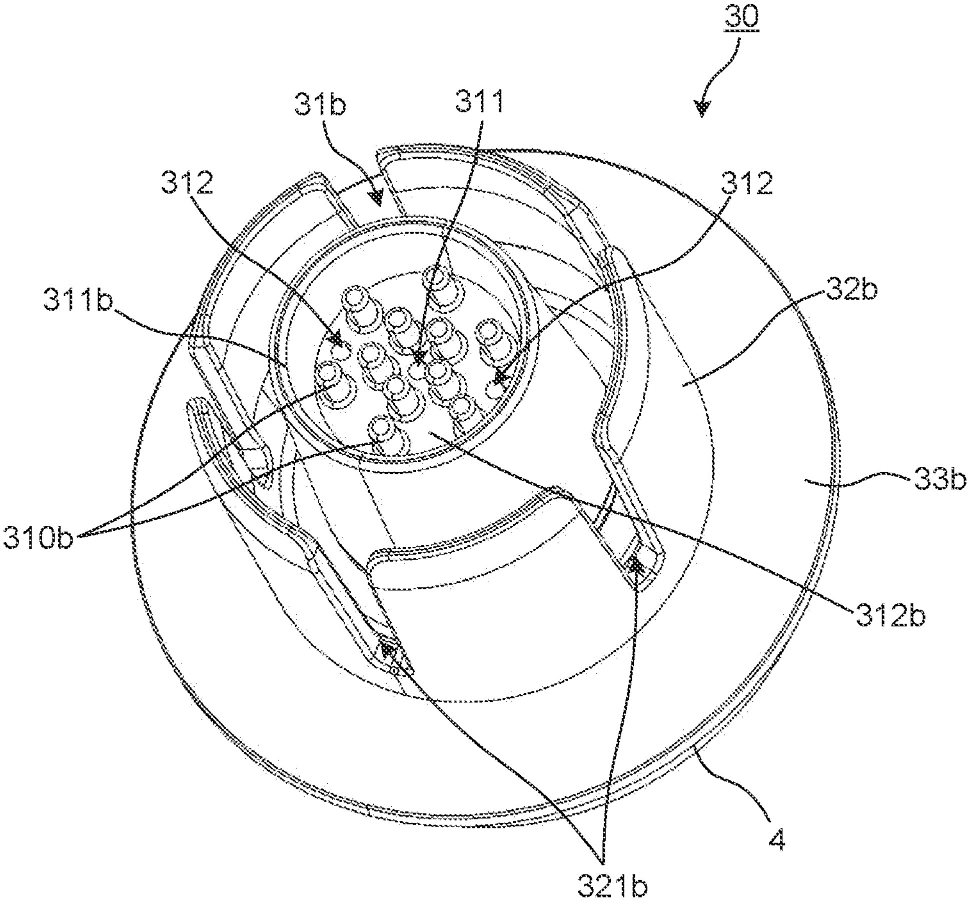
FIG. 7 is a perspective view illustrating a head unit with another configuration.
Figure 8:
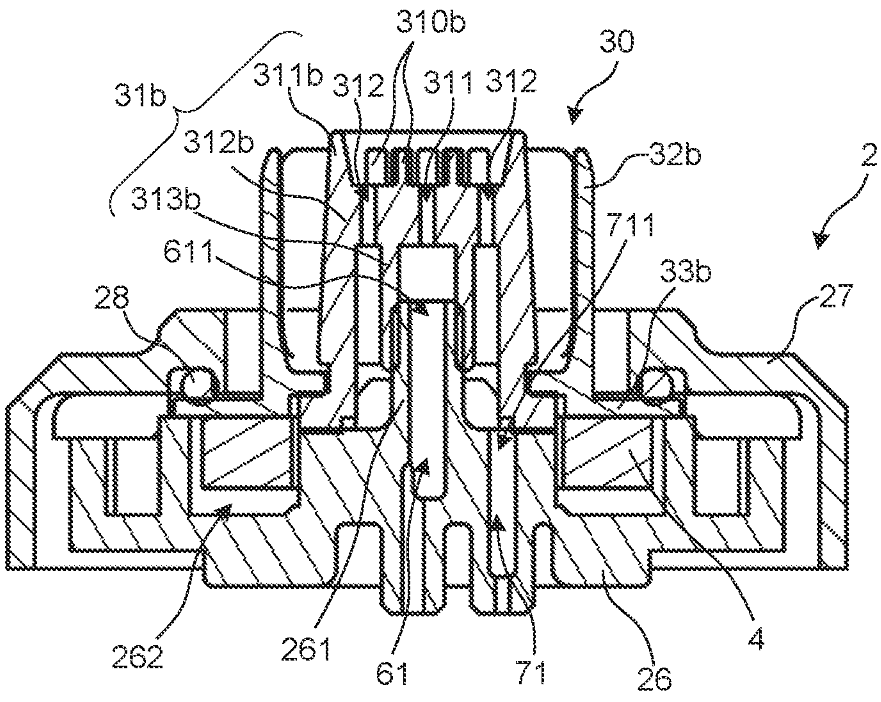
FIG. 8 is a sectional view of the head unit illustrated in FIG. 7 being fixed to the machine body.

FIG. 7 is a perspective view illustrating the head unit with another configuration. FIG. 8 is a sectional view of the head unit illustrated in FIG. 7 being fixed to the machine body. In the following description, the upper side in FIG. 8 is also referred to as "top" or "upper" and the lower side as "bottom" or "lower".

A head unit 30 illustrated in FIG. 7 has a seal member 31*b* at its center part. This seal member 31*b* has a cylindrical portion 311*b* and a division wall 312*b* disposed at the middle part of in the height direction of the cylindrical portion 311*b*.

The overall shape of the seal member 31*b* is not limited to a cylindrical shape, but may be a square cylinder, as long as the seal member 31*b* has a shape capable of forming a sealed space (closed space) with the skin surface.

As illustrated in FIG. 8, the division wall 312*b* has a plurality of projections 310*b* projecting upwardly from the upper face of the division wall 312*b*. The division wall 312*b* has the through hole 311 disposed substantially on the central axis of the division wall 312*b* and a pair of through holes 312 disposed on opposite sides across the through hole 311. Therefore, the upper portion of the seal member 31*b* may be described to have a configuration similar to the above brush structure 310.

Furthermore, the division wall 312*b* has a circular tubular fitting portion 313*b* protruding downwardly from the center part of the lower face of the division wall 312*b*. The inner cavity of the fitting portion 313*b* is connected to the through hole 311.

On the outer circumference side of the seal member 31*b*, an annular vibration body 32*b* is disposed with a gap therebetween. In this configuration example, the vibration body 32*b* has a plurality of slits 321*b* along its circumferential direction. Such slits 321*b* can increase the amplitude of the vibration body 32*b*.

The plurality of slits 321*b* may be disposed unevenly along the circumferential direction of the vibration body 32*b*, but may be disposed at a substantially equal interval. In the latter case, the amplitude of the vibration body 32*b* can be made uniform in the circumferential direction.

The number of slits 321*b* is not particularly limited, as is set appropriately depending on the diameter of the vibration body 32*b*, but may be 3 to 10 or may be 5 to 8.

The configuration of the vibration body 32*b* is not limited to the above configuration. For example, the configuration may be such that a plurality of arc-shaped plates are arranged at an interval, and a space between each pair of adjacent plates functions as a slit.

A plurality of vibration bodies 32*b* may be arranged concentrically in a double or triple configuration.

At the lower end part of the vibration body 32*b*, a disk-shaped support 33*b* projecting toward the lateral side (radially outward) is formed as a whole with the vibration body 32*b*.

In this configuration example, the ultrasonic vibrator 4 is fixed to the bottom face of this support 33*b*. The configuration is such that when the head unit 30 is attached to the cleansing machine body 2, the ultrasonic vibrator 4 is electrically connected to the power supply apparatus 8.

In this configuration example, a mount 26 is fixed to the top face of the upper case 21 in such a manner that the mount 26 closes the upper opening 213. In FIG. 8, the upper case 21 is omitted.

With the head unit 30 attached to the mount 26, attaching a fixing cover 27 to the upper case 21 fixes the head unit 30 to the cleansing machine body 2. In this state, an O-ring 28 is disposed between the fixing cover 27 and the support 33*b* of the head unit 30, ensuring liquid tightness inside the cleansing machine 1.

The mount 26 is formed as a disk-shaped member. The center part of the mount 26 has a protrusion 261 protruding upward. A through hole 61 is formed continuously from this protrusion 261 in the mount 26. The through hole 61 has an opening at the upper end of the protrusion 261, forming the supply port 611.

The through hole 71 is formed at a position shifted radially outward from the protrusion 261 of the mount 26, and its upper end opening forms the suction port 711.

An annular recess 262 is disposed on the outer circumferential side of the protrusion 261 (through hole 61) and the through hole 71 of the mount 26, the recess 262 being recessed downward.

When the head unit 30 is attached to the mount 26, the protrusion 261 is inserted and fitted into the fitting portion 313*b*, and the ultrasonic vibrator 4 is accommodated in the recess 262.

Thus, in this configuration example, the cleansing agent is supplied to the skin surface via the through hole 61 and the supply port 611 disposed at the center part of the cleansing machine body 2 and the through hole 311 disposed at the center part of the head unit 30 (seal member 31*b*).

The cleansing agent to which sebum and dirt have migrated is sucked into the cleansing machine body 2 via the through hole 312 shifted radially outward from the center part of the head unit 30 (seal member 31*b*) and via the suction port 711 and through hole 71 shifted radially outward from the center part of the cleansing machine body 2.

In this configuration example, the head unit 30 is fixed to the cleansing machine body 2 in a non-detachable manner, but in such a configuration, the seal member 31*b* may be configured to be replaceable with a seal member having the same configuration or with one of seal members of a plurality of types having different configurations. This allows the seal member 31*b* to be replaced with a new seal member 31*b* when the seal member 31*b* wears out, or a different seal member 31*b* can be used depending on the purpose.

In this case, the plurality of seal members 31*b* can be configured to differ from each other, for example, in at least one of size (outer diameter), material (flexibility), shape of the projections 310*b*, number of the projections 310*b*, size (outer diameter) of the projections 310*b* and change rate along its longitudinal direction, number of the through holes 311, and number of the through holes 312.

The suction mechanism 7 can be configured as described below.

Figure 9:
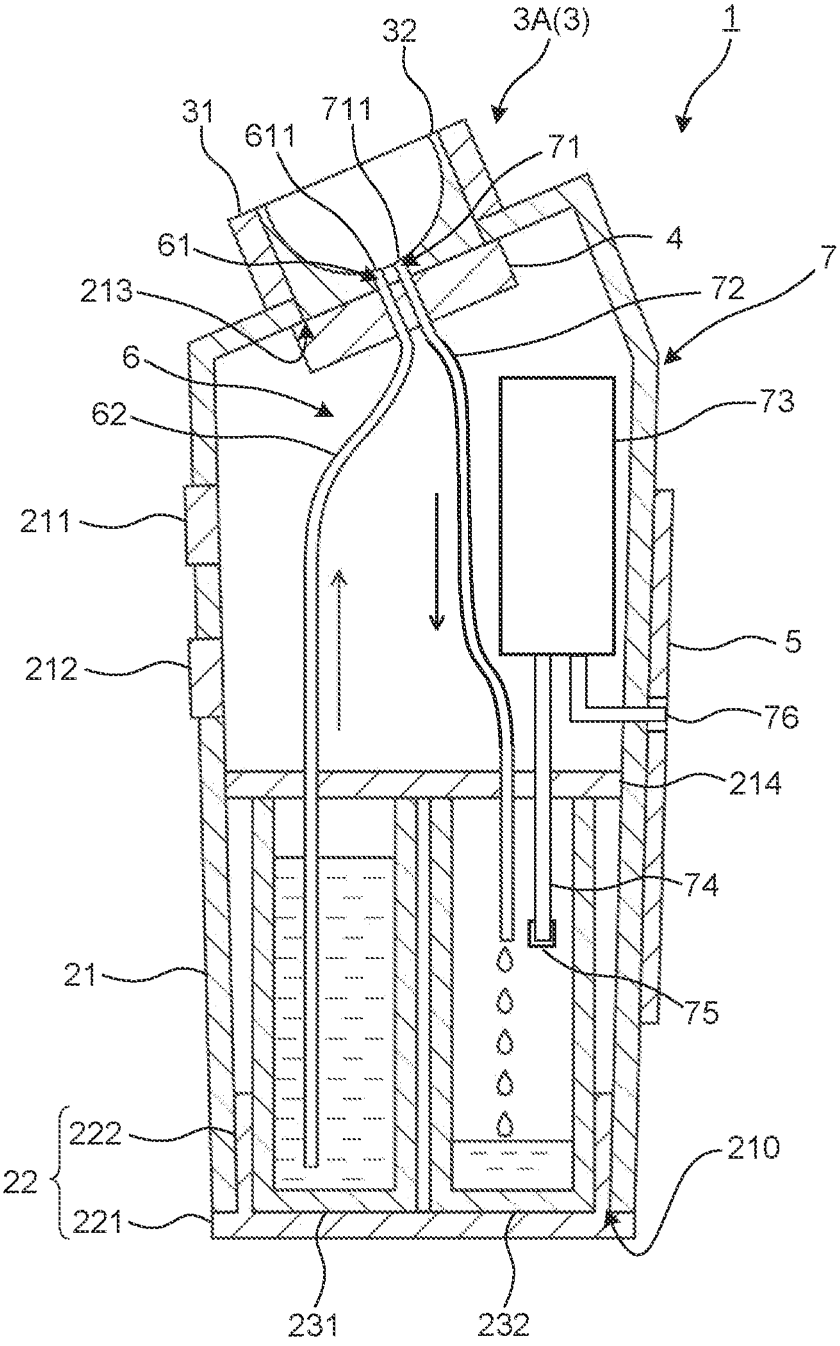
FIG. 9 is a sectional view of a suction mechanism with another configuration.

FIG. 9 is a sectional view of a suction mechanism with another configuration.

In the following explanation, the left side in FIG. 9 is also referred to as "front" and the right side in FIG. 9 as "back" or "rear".

In the suction mechanism 7 illustrated in FIG. 9, the pump 73 is disposed separately from the suction tube 72. Two tubes 74 and 76 are connected to the pump 73.

The tube 74 penetrates the division wall 214 and is configured so that its lower end part is disposed inside the second compartment 232 when the lower case 22 is attached to the upper case 21. On the other hand, the tube 76 penetrates the upper case 21 and is connected to the outside.

With the above configuration, bringing the seal member 31 into contact with the skin surface connects the supply tube 62, the suction tube 72, and the tube 74 via the closed space (sealed space) defined by the seal member 31 and the skin surface. In this state, activating the pump 73 allows the cleansing agent to be supplied to the skin surface via the supply tube 62, the through hole 61, and the supply port 611 in sequence (i.e., supplied from the supply mechanism 6).

The cleansing agent supplied to the skin surface passes through the suction port 711, the through hole 71, and the suction tube 72 in sequence and is collected into the second compartment 232.

With such a configuration, the cleansing agent containing sebum and keratin plugs does not pass through the pump 73, which can reduce the frequency of maintenance of the cleansing machine 1, such as pump cleansing.

In the configuration illustrated in FIG. 9, a filter 75 covers an end part of the tube 74 opposite to the pump 73. This filter 75 functions to allow the passage of gas but prevent the passage of liquid. The filter 75 can suitably prevent the cleansing agent from leaking out from the second compartment 232.

The filter 75 may be omitted.

Second Embodiment

Next, a description will be given of a cleansing machine according to the second embodiment of the present disclosure.

The following description of a cleansing machine 1' according to the second embodiment will focus on the differences from the above-described cleansing machine 1 according to the first embodiment, and omit similar matters.

Figure 10:
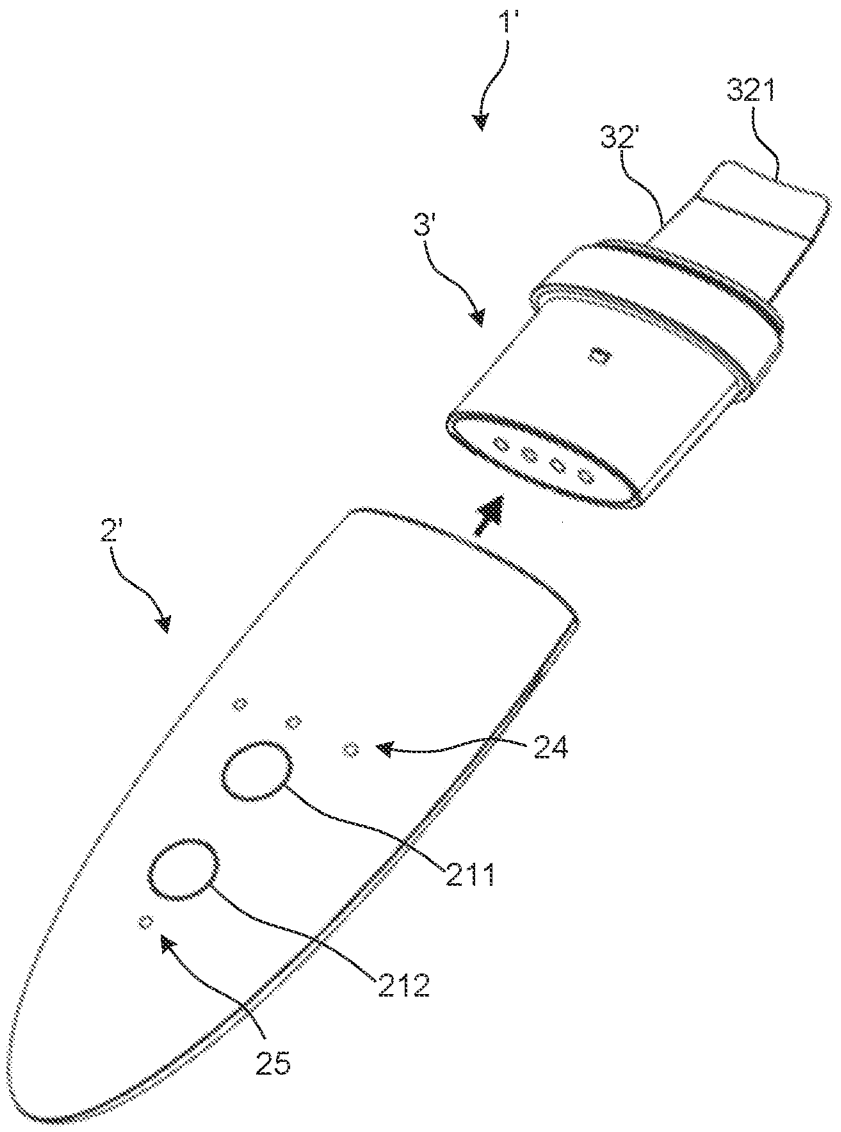
FIG. 10 is a plan perspective view of a cleansing machine according to the second embodiment of the present disclosure.
Figure 11:
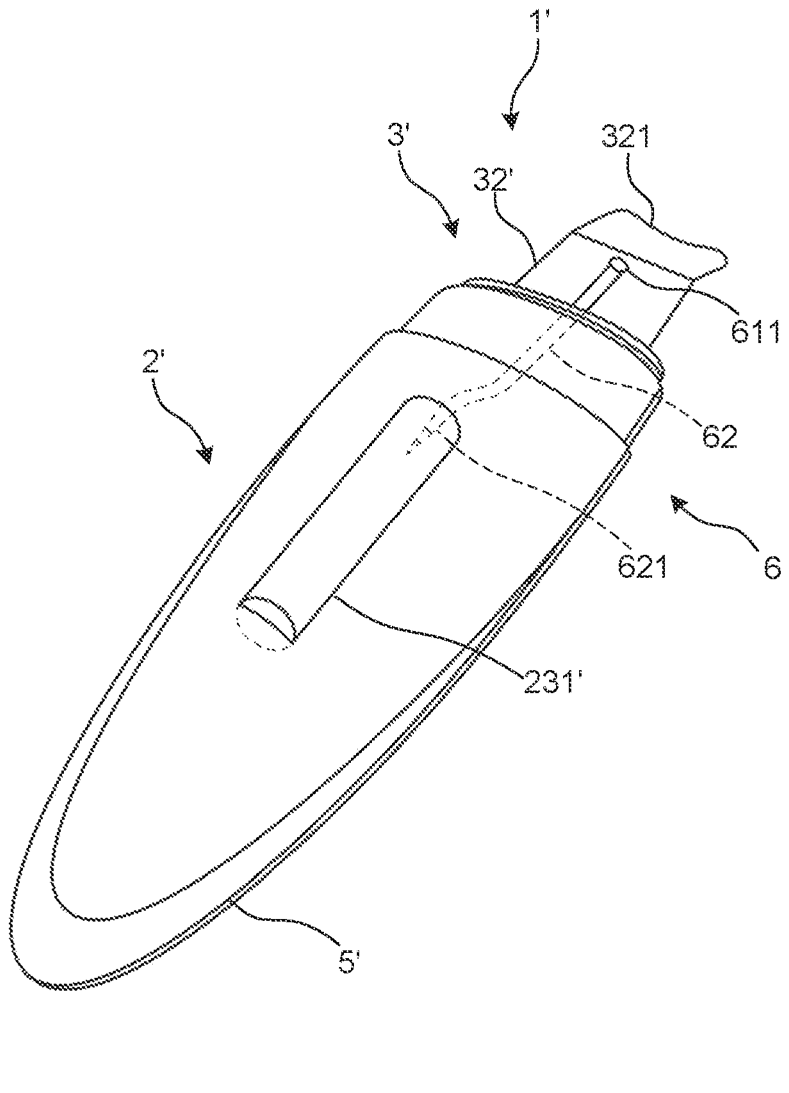
FIG. 11 is a bottom perspective view of the cleansing machine according to the second embodiment.

FIG. 10 is a plan perspective view the cleansing machine according to the second embodiment of the present disclosure. FIG. 11 is a bottom perspective view of the cleansing machine according to the second embodiment.

In the following explanation, the near side in FIG. 10 is also referred to as "front" and the deep side in FIG. 10 as "rear" or "back". The deep side in FIG. 11 is also referred to as "front", and the near side in FIG. 11 as "back" or "rear".

The cleansing machine 1' according to the second embodiment has a different overall shape (especially the shape of the vibration body 32') and does not have the suction mechanism 7, but the other components are similar to the components of the cleansing machine 1 according to the first embodiment.

As illustrated in FIG. 10, a front face of a cleansing machine body 2' has three mode lamps 24 and a charging lamp 25 as well as operation buttons 211 and 212.

A vibration body 32' according to the second embodiment has a blade shape (flat plate shape). The thickness of the blade-shaped vibration body 32' may be about 0.2 mm to about 0.8 mm, or may be about 0.4 mm to about 0.6 mm.

The tip part of the vibration body 32' is bent at a degree of about 10° to about 20°, and its tip face 321 is a curved concave face for increasing a contact area with the skin surface. The tip corner of the vibration body 32' is rounded (R-edged), which enhances safety for the user.

A hand electrode 5' is disposed over the edge part from the lateral side to the rear side of the cleansing machine body 2', as illustrated in FIG. 11.

In the cleansing machine 1' according to the second embodiment, as illustrated in FIG. 11, a cartridge-type first compartment 231' is configured to be detachably attachable to the rear face of the cleansing machine body 2'.

As the supply mechanism 6, a supply tube 62 made of metal or hard resin, for example, is provided to from the cleansing machine body 2 to the head unit 3'. The supply port 611 at one end of the supply tube 62 is disposed near the bend part of the vibration body 32'. The other end of the supply tube 62 has a puncture needle (such as a vented spike) 621 for piercing a plug in the first compartment 231'.

The first compartment 231' according to the second embodiment is made of a flexible material, for example. In this case, by pressing the container itself with a finger or the like, the cleansing agent can be supplied via the supply port 611 to the surface of the vibration body 32' and the skin surface.

With such a configuration according to the second embodiment, for prevention or hinderance of quick dissipation of the cleansing agent from the desired area of the skin surface, a gel cleansing agent is suitably used.

The cleansing machine 1' according to the second embodiment as described above exhibits actions and effects similar to those of the above-described cleansing machine 1 according to the first embodiment.

When protein hydrolysis enzyme is used in the cleansing agent, the protein hydrolysis enzyme may be separated from the cleansing agent (water, etc.) until immediately before use from the viewpoint of preventing transformation and deterioration of the protein hydrolysis enzyme. In the cartridge-type first compartment 231', the internal space may be divided by an easily breakable division wall, and may be configured to accommodate the protein hydrolysis enzyme in one space and the cleansing agent in the other space. The division wall can be configured to be broken, for example, upon connection of the first compartment 231' (stopper) and the supply tube 62 (puncture needle).

The configurations described above can provide a cleansing machine capable of easily removing not only sebum on the skin surface but also keratin plugs clogged in pores with the combination of vibration and cleansing agent supplied to the skin surface. In addition, since the configuration does not remove keratin plugs by forcible suction, damage to the skin surface can be prevented or hindered from occurring. Furthermore, since the user can replace the cleansing water and the peeling agent as the cleansing agent with each other depending on the condition of his/her own skin surface, the occurrence of damage to the skin surface can be more easily prevented.

Any of the configurations in the above-described first and second embodiments may be combined with each other.

The present disclosure may be provided in each of the following aspects.

(1) A cleansing machine used for cleansing a user's skin surface, comprising: a cleansing machine body; a vibration application mechanism including a vibration body configured to apply vibration to the skin surface when the vibration body is in contact with the skin surface; and a supply mechanism including a supply port from which a liquid or gel cleansing agent is supplied to the skin surface.

(2) The cleansing machine according to (1), further comprising a suction mechanism including a suction port into which the cleansing agent supplied to the skin surface is sucked.

(3) The cleansing machine according to (2), further comprising a seal member configured to form a closed space with the skin surface when the seal member is in contact with the skin surface, the closed space communicating with the supply port and the suction port.

(4) The cleansing machine according to (3), wherein: the vibration body is cup-shaped and disposed on an inner side of the seal member.

(5) The cleansing machine according to (4), wherein: the supply port and the suction port are disposed at a center part of the cup-shaped vibration body.

(6) The cleansing machine according to (3), wherein: the vibration body has a cylindrical protrusion where the supply port and the suction port are disposed, and the seal member is disposed on an outer side of the protrusion.

(7) The cleansing machine according to (3), wherein: the vibration body is annular and disposed on an outer side of the seal member.

(8) The cleansing machine according to (7), wherein: the vibration body has a plurality of slits arranged along a circumferential direction of the vibration body.

(9) The cleansing machine according to (8), wherein: the plurality of slits are arranged at a substantially equal interval along the circumferential direction of the vibration body.

(10) The cleansing machine according to (3), comprising a plurality of the seal members of different types, the cleansing machine being configured to be used in a state where one selected from the plurality of the seal members is attached to the vibration body.

(11) The cleansing machine according to (3), wherein: the cleansing machine body further has a cleansing agent compartment configured to accommodate the cleansing agent, the suction mechanism further includes: a suction channel connected to the suction port; and a pump configured to reduce a pressure in the suction channel, the supply mechanism further includes a supply channel communicating with the supply port and the cleansing agent compartment, and the cleansing machine is configured to supply the cleansing agent from the supply mechanism to the skin surface by activating the pump in a state where the seal member is in contact with the skin surface.

(12) The cleansing machine according to (1), wherein: the vibration body is blade-shaped, and the supply port is disposed on the vibration body.

(13) The cleansing machine according to (1), further comprising a charge mechanism configured to charge the vibration body with a positive charge or a negative charge.

(14) The cleansing machine according to (1), wherein: the cleansing agent contains a cleansing water or a peeling agent.

Of course, the present disclosure is not limited to these.

As described, various embodiments of the present disclosure have been described, but these are presented as examples and are not intended to limit the scope of the disclosure. Novel embodiments can be implemented in various other forms, and various omissions, replacements, and modifications can be made within the scope of the spirit of the disclosure. The embodiments and its modifications are included in the scope and the spirit of the disclosure and are included in the scope of the invention described in claims and the equivalent scope thereof.

What is claimed is:

1. A cleansing machine used for cleansing a skin surface of a user, comprising:

a cleansing machine body configured to be grasped by the user to operate a cleansing process, the cleaning machine body including a cleansing agent compartment, the cleansing agent compartment being configured to accommodate a liquid or gel cleansing agent therein;

a seal member configured to form a closed space with the skin surface when the seal member is in contact with the skin surface;

a vibration application mechanism including a vibration body configured to apply vibration to the skin surface when the vibration body is in contact with the skin surface;

a supply mechanism including a supply port, the supply mechanism being configured to supply the liquid or gel cleansing agent to the skin surface from the cleansing agent compartment via the supply port; and a suction mechanism including a suction port, the suction mechanism being configured to suck the supplied liquid or gel cleansing agent from the closed space via the suction port, wherein the supply port and the suction port directly communicate with each other via the closed space.

2. The cleansing machine according to claim 1, wherein: the vibration body is cup-shaped and disposed on an inner side of the seal member with respect to the closed space.

3. The cleansing machine according to claim 2, wherein: the supply port and the suction port are disposed at a center part of the cup-shaped vibration body.

4. The cleansing machine according to claim 1, wherein: the vibration body has a cylindrical protrusion where the supply port and the suction port are disposed, and the seal member is disposed on an outer side of the protrusion.

5. The cleansing machine according to claim 1, wherein: the vibration body is annular and disposed on an outer side of the seal member.

6. The cleansing machine according to claim 5, wherein: the vibration body has a plurality of slits arranged along a circumferential direction of the vibration body.

7. The cleansing machine according to claim 6, wherein: the plurality of slits are arranged at a substantially equal interval along the circumferential direction of the vibration body.

8. The cleansing machine according to claim 1, comprising a plurality of the seal members of different types, the cleansing machine being configured to be operated in a state where one selected from the plurality of the seal members is attached to the vibration body.

9. The cleansing machine according to claim 1, wherein:

the suction mechanism further includes:

a suction channel connected to the suction port; and a pump configured to reduce a pressure in the suction channel, the supply mechanism further includes a supply channel communicating with the supply port and the cleansing agent compartment, and the cleansing machine is configured to supply the cleansing agent from the supply mechanism to the skin surface by activating the pump in a state where the seal member is in contact with the skin surface.

10. The cleansing machine according to claim 1, further comprising a charge mechanism configured to charge the vibration body with a positive charge or a negative charge.

11. The cleansing machine according to claim 1, wherein: the cleansing agent contains a cleansing water or a peeling agent.

* * * * *